United States Patent

[11] 3,583,280

[72] Inventor Charles E. Hart
 Xenia, Ohio
[21] Appl. No. 802,814
[22] Filed Feb. 27, 1969
[45] Patented June 8, 1971
[73] Assignee Cincinnati Milacron Inc.
 Cincinnati, Ohio

[54] MECHANISM FOR CONNECTING AND DISCONNECTING A TOOL ADAPTER IN A SPINDLE OF A TOOL MACHINE
10 Claims, 5 Drawing Figs.

[52] U.S. Cl. ................................................ 90/11, 279/75
[51] Int. Cl. ................................................ B23c 1/00
[50] Field of Search ...................................... 90/11.1; 29/268; 279/1 E, 75

[56] References Cited
UNITED STATES PATENTS

| | | | |
|---|---|---|---|
| 2,135,861 | 11/1938 | Thompson | 279/75 X |
| 2,749,806 | 6/1956 | Stephan | 90/11 |
| 3,152,811 | 10/1964 | Perrin | 279/75 X |
| 3,474,705 | 10/1969 | Jacob, Jr. | 90/11 |

*Primary Examiner*—Gil Weidenfeld
*Attorney*—Frank C. Leach, Jr.

ABSTRACT: A tool adapter, which has a tool connected thereto, is retained within a spindle with the tool adapter and the spindle having cooperating tapered surfaces to produce a tight fit therebetween. First means moves the tool adapter to break the connection between the tool adapter and the spindle while second means, which moves in the opposite direction to the first means, renders the means, which retains the tool adapter within the spindle, ineffective after the tool adapter has been grasped by a tool transfer arm.

INVENTOR
CHARLES E. HART

BY Frank C. Leach Jr.,
ATTORNEY

MECHANISM FOR CONNECTING AND DISCONNECTING A TOOL ADAPTER IN A SPINDLE OF A TOOL MACHINE

In automatic cool changing mechanisms such as the tool changing mechanism shown and described in U.S. Pat. No. 3,259,976 to Bergstrom et al. for example, a tool is automatically transferred to or away from a spindle. In the aforesaid Bergstrom et al. patent, there is shown a mechanism for automatically transferring a tool from a storage drum to one of a pair of spindles on a turret. Thus, one of the spindles has a tool therein for milling purposes, for example, while the other spindle has a new tool disposed therein after a tool, which has been used and needs replacing, has been removed therefrom.

In order to retain a tool adapter, which supports the tool, with a spindle, it has previously been suggested to employ cooperating tapered surfaces on the tool adapter and in the spindle. This permits the tool adapter to be self-centered in the spindle when loaded by an automatic changing mechanism and provides a tight fit between the tool adapter and the spindle. However, to break this tight connection between the tool adapter and the spindle, it is necessary to employ a relatively strong force.

This strong force can cause the tool adapter to be completely removed from the spindle and fall on the floor, for example, whereby the tool can be damaged. Thus, while the tapered configuration is most desirable with automatic tool changing mechanisms due to the self-centering feature, the possible damage to the tool because of the force required to break the tight fit has limited any utilization with automatic tool changing mechanisms.

The present invention satisfactorily solves the foregoing problems by providing a mechanism in which the tapered configuration between the tool adapter and the spindle may be satisfactorily employed with automatic tool changing mechanisms without any possible damage to the tool from falling out of the spindle when the connection between the tool adapter and the spindle is being broken. The present invention brakes the tight connection between the tool adapter and the spindle while still positively retaining the tool adapter from being urged out of the spindle due to the breaking force. Thus, in the present invention, a second separate motion is required before the tool adapter can be released from the spindle and completely removed therefrom. Accordingly, there is no danger of the tool adapter being completely removed from the spindle by the force that breaks the tight fit.

Therefore, the present invention permits a tool adapter to be mounted in the spindle with tapered cooperating surfaces therebetween and to still be satisfactorily usable with an automatic tool changing mechanism. The retention of the tool adapter within the spindle after its connection with the spindle has been broken by suitable means insures that the tool adapter is retained within the spindle until after the transfer arm of a tool changing mechanism has grasped the tool adapter.

An object of this invention is to provide a mechanism for breaking and making the connection between a tool adapter and a spindle of a tool machine.

Other objects of this invention will be readily perceived from the following description, claims, and drawings.

This invention relates to an improvement for a machine tool having a spindle and a tool adapter for supporting a tool. The spindle and the tool adapter have cooperating surfaces to form a tight fit therebetween to support the tool adapter within the spindle. The tool adapter is retained in the spindle by suitable means. The improvement comprises first means to break the connection between the cooperating surfaces of the tool adapter and the spindle and second means to render the retaining means ineffective only after the first means has broken the connection between the tool adapter and the spindle.

The attached drawings illustrate a preferred embodiment of the invention, in which.

Figure 1A:
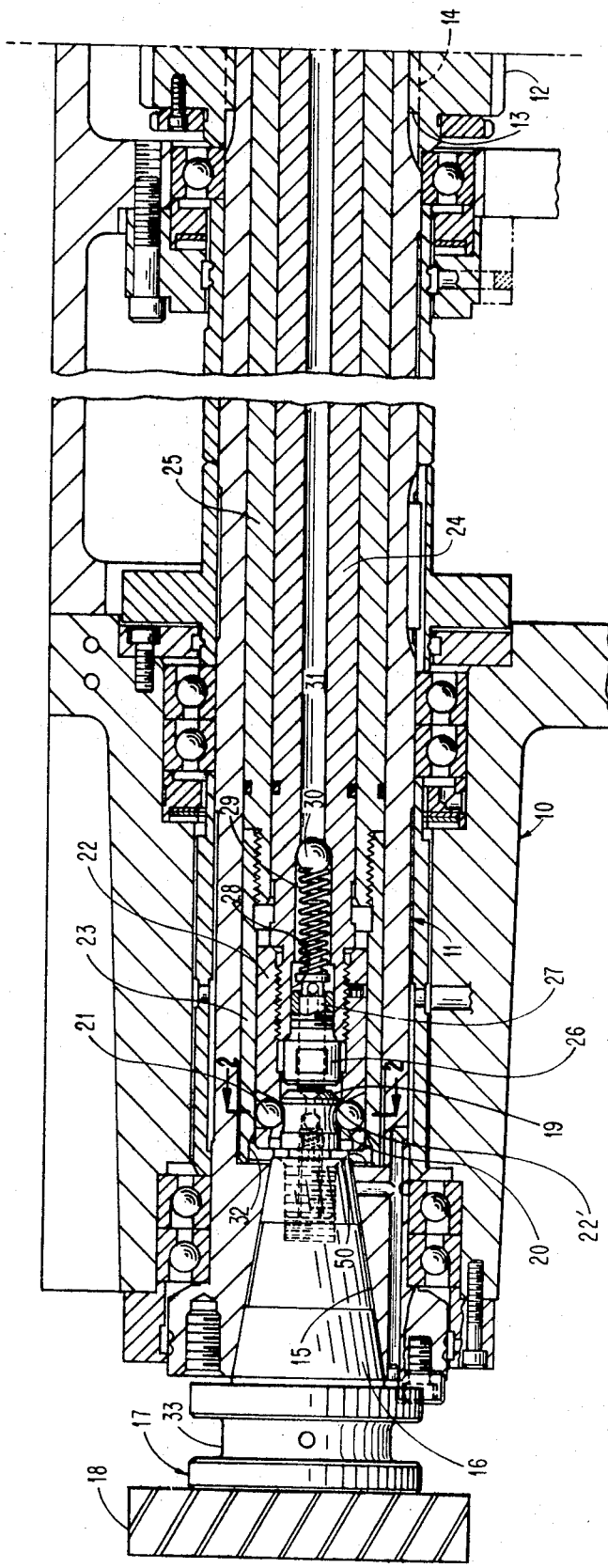
FIG. 1A is a longitudinal sectional view of one portion of a spindle housing including a portion of the connect and disconnect mechanism of the present invention.
Figure 1B:
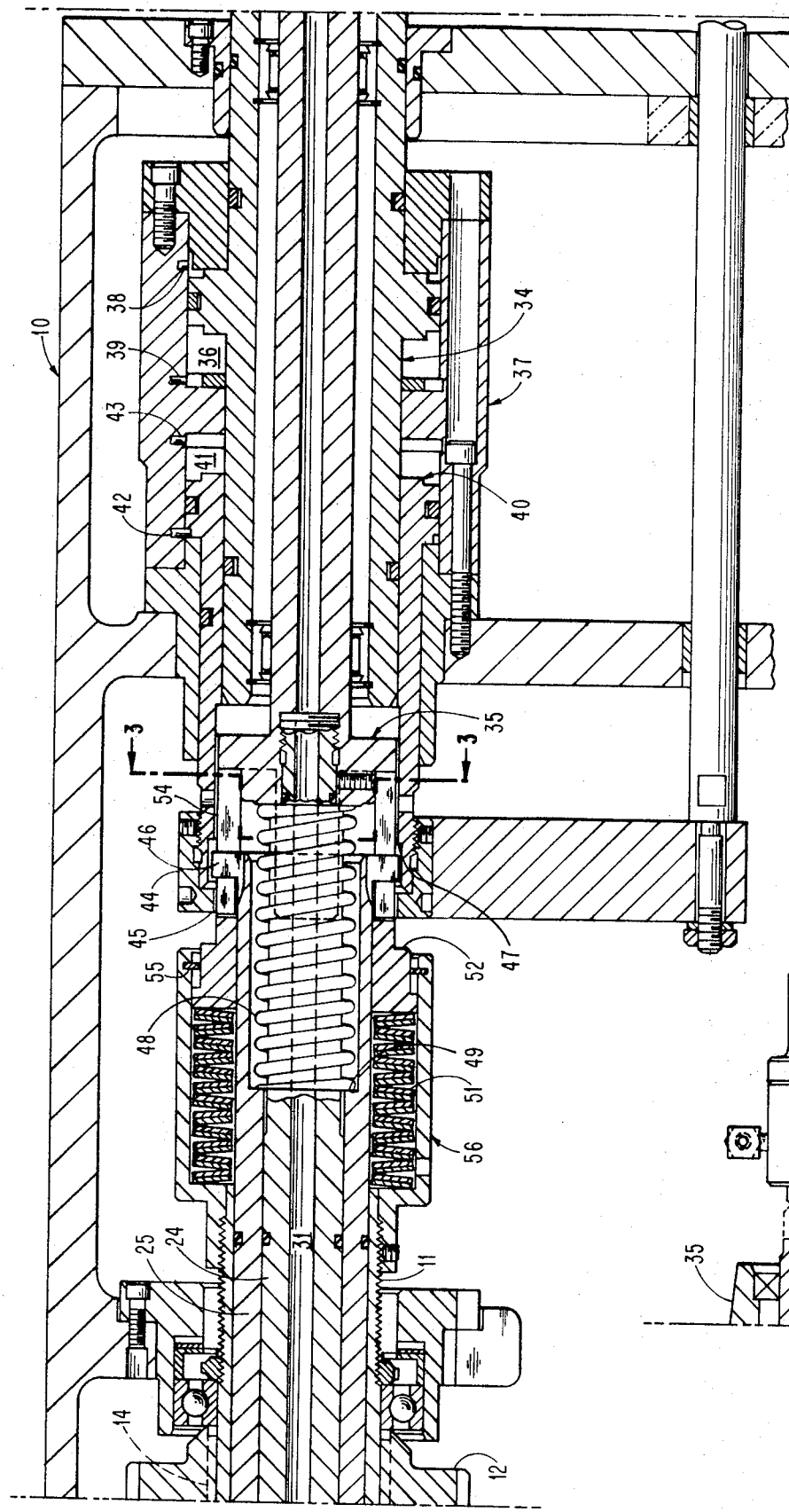
FIG. 1B is a longitudinal sectional view forming a continuation of FIG. 1A and shows another portion of the connect and disconnect mechanism of the present invention.
Figure 1C:
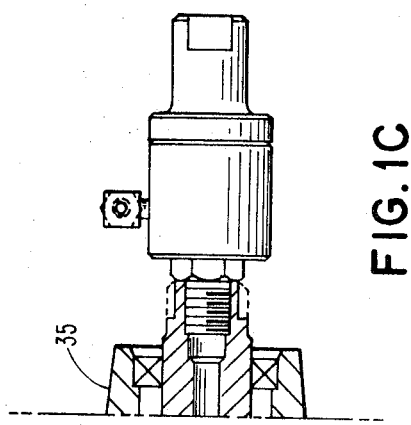
FIG. 1C is a longitudinal sectional view forming a continuation of FIG. 1B and shows the remainder of the spindle housing.

Referring to the drawings and particularly FIGS. 1A—1C, there is shown a spindle carrier housing 10 having a spindle 11 supported for rotation therein by means of antifriction bearings. The spindle 11 is adapted to be rotated by a transmission (not shown) driving a gear 12, which also has its inner surface formed with teeth 13 for meshing with teeth 14 on the spindle 11.

The forward or left end of the spindle 11 has a tapered recess 15 formed therein to receive a cooperating tapered portion 16, which has a relieved central area, of a tool adapter 17. When the tool adapter 17, which supports a tool 18 such as a milling cutter, for example, is connected to the spindle 11 by being disposed within the recess 15 and having a tight fit between the tapered surfaces of the tool adapter 17 and the recess 15, the tool adapter 17 rotates with the spindle 11. The tool adapter 17 is supported by the spindle 11 so that the tool 18, which is connected to the tool adapter 17, may be subjected to heavy forces during cutting.

The tool adapter 17 has an extension 19 threadedly connected thereto and formed with a cylindrically shaped surface of reduced diameter to provide a groove 20 for cooperating with balls 21, which are carried in a cage 22. The extension 19 has a radial surface (one shown at 22') on each end of the cylindrically shaped surface to provide a smooth transition from the groove 20.

When the balls 21 are disposed as shown in FIG. 1A, the tool adapter 17 is retained within the spindle 11 by the balls 21. A sleeve 23 surrounds the cage 22 and retains the balls 21 in the position shown in FIG. 1A wherein the balls 21 are wedged between the sleeve 23 and the radial surface 22' of the extension 19.

The cage 22 is fastened to a draw bar 24 by threads at the end of the cage 22 remote from the balls 21. The sleeve 23 is fastened by threads to a sleeve 25, which surrounds the draw bar 24. Accordingly, movement of the draw bar 24 and the sleeve 25 in opposite directions creates relative movement between the cage 22 and the sleeve 23.

When it is desired to break the tight connection between the tool adapter 17 and the spindle 11, the draw bar 24 is moved towards the tool adapter 17. This causes a plug 26, which is threaded in the end of the draw bar 24, to engage the end of the extension 19 of the tool adapter 17 after the clearance between the plug 26 and the extension 19 of the tool adapter 17 is taken up. This clearance is approximately 0.06 percent. This movement of the draw bar 24 is applied with sufficient force to break the connection between the tool adapter 17 and the spindle 11.

Since the cage 22 is fastened to the draw bar 24, the cage 22 moves with the draw bar 24 and moves the balls 21, which are carried by the cage 22, therewith. Thus, after the cage 22 has moved the balls 21 0.06 inches, the extension 19 of the tool adapter 17 also moves with the balls 21 and the cage 22 due to the plug 26 engaging the extension 19 of the tool adapter 17. As a result, the balls 21 retain the tool adapter 17 connected to the draw bar 24 by being retained within the groove 20 even though the tool adapter 17 is no longer connected to the spindle 11.

The total movement of the draw bar 24 is 0.12 inches. Thus, movement of the tool adapter 17 by the draw bar 24 is 0.06 inches because of the clearance of 0.06 inches between the plug 26 and the extension 19 of the tool adapter 17.

However, the tool adapter 17 is moved 0.12 inches too. This is because a plunger 27, which is slidably carried within a recess 28 in the draw bar 24 and extends through a passage in the plug 26, is biased into engagement with the extension 19 by a spring 29.

Therefore, after movement of the draw bar 24 for the distance of 0.12 inches is completed, the spring 29 urges the plunger 27 through the plug 26 to cause an additional 0.06 inches of movement of the tool adapter 17. This again produces the same clearance between the extension 19 of the tool adapter 17 and the plug 26 of the draw bar 24 as shown in FIG. 1A.

The other end of the spring 29 acts against a ball 30, which closes a coolant passage 31 within the draw bar 24. The coolant to be supplied to the tool adapter 17.

After the movement of the tool adapter 17 by the draw bar 24 is completed, the sleeve 23 is moved to the right due to the sleeve 25 being moved to the right. This results in an enlarged area 32 of the sleeve 23 being disposed in surrounding relation to the balls 21. The enlarged area 32 is formed at the left end of the sleeve 23 as shown in FIG. 1A.

This arrangement allows the tool adapter 17 to be pulled out of the spindle 11 by a transfer arm, which is disposed within a groove 33 in the tool adapter 17, in the manner more particularly shown and described in the aforesaid Bergstrom et al. patent. Thus, the large end of the extension 19 pushed the balls 21 into the enlarged area 32 of the sleeve 23 when the tool adapter 17 is moved to the left by a tool transfer arm of a tool change mechanism.

The movement of the draw bar 24 to the left to break the tight fit between the tool adapter 17 and the spindle 11 is accomplished by moving a piston 34 (see FIG. 1B) to the left to engage against a cylindrical-shaped member 35, which has its left end threaded to the right end of the draw bar 24. The piston 34 is moved to the left when fluid is introduced into one side of a chamber 36 in a housing 37, which is supported by the spindle carrier housing 10, by a passage 38 and removed from the other side of the chamber 36 by a passage 39. Thus, this supply of fluid to the chamber 36 through the passage 38 and removal of fluid from the chamber 36 through the passage 39 results in the piston 34 moving the draw bar 24 to break the connection between the tool adapter 17 and the spindle 11.

The sleeve 25 is pulled to the right when a piston 40 is moved to the right. When fluid is introduced into a chamber 41 in the housing 37 through a passage 42 and removed therefrom through a passage 43, the piston 40 is moved to the right.

When the piston 40 moves to the right, a nut 44, which is mounted on the left end of the piston 40, has a downwardly projecting shoulder 45 engage ears 46 on the sleeve 25. This causes sufficient movement of the sleeve 23 to the right to allow the balls 21 to be moved into the enlarged area 32 of the sleeve 23 when the tool adapter 17 is to be removed from the spindle 11.

Thus, positive control of both the breaking of the connection between the tool adapter 17 and the spindle 11 and the release of the retaining means for holding the tool adapter 17 within the spindle 11 is accomplished. Fluid cannot be supplied to the chamber 41 through the passage 42 and removed therefrom through the passage 43 until after there has been completion of movement of the draw bar 24 to the left and a tool transfer arm of a tool change mechanism has been engaged with the tool adapter 17 by being disposed within the groove 33 of the tool adapter 17.

When it is desired to load another of the tool adapters 17 within the spindle 11, the tool adapter 17 has its tapered portion 16 disposed within the recess 15 and its extension 19 inserted within the cage 22 so that the balls 21 are disposed within the groove 20 of the extension 19. At this time, the piston 40 is moved to the left by introducing fluid into the chamber 41 through the passage 43 and removing fluid from the chamber 41 by the passage 42. This causes a shoulder 47 on the piston 40 to engage the ears 46 on the sleeve 25. This pushes the sleeve 23 to the left to urge the balls 21 into a position in which the balls 21 are disposed within the sleeve 23 so that there is only a slight clearance between the sleeve 23 and the balls 21 due to the balls 21 being disposed in the groove 20.

A coil spring 48, which surrounds the draw bar 24, has one end acting against the cylindrical-shaped member 35 and its other end acting against a shoulder 49 on the sleeve 25. The coil spring 48 aids in returning the sleeve 23 to the left and insures that the end of the sleeve 23 abuts against an end 50 of the chamber within the spindle 11 in which the sleeve 23 is disposed.

After completion of movement of the piston 40, the transfer arm of the tool changing mechanism may be removed from the groove 33 in the tool adapter 17. Then, the piston 34 is moved to the right by supplying fluid to the chamber 36 through the passage 39 and removing fluid from the chamber 36 through the passage 38. This removes the piston 34 from engagement with the hollow cylindrical member 35.

Figure 3:
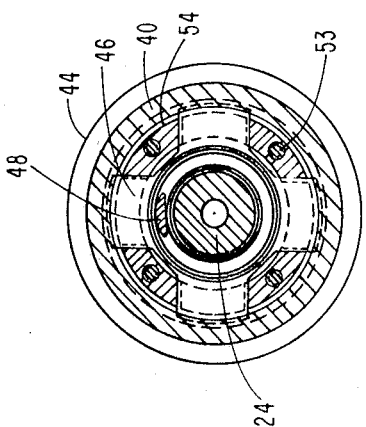
FIG. 3 is a sectional view taken along line 3-3 of FIG. 1B and shows a portion of the connect and disconnect mechanism of the present invention.
Figure 2:
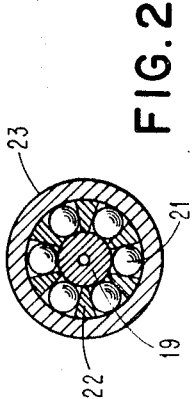
FIG. 2 is a sectional view taken along line 2-2 of FIG. 1A and shows a portion of the means for retaining the tool adapter within the spindle.

As a result, a spring 51, which preferably comprises a plurality of Belleville washers, urges the draw bar 24 to the right. The spring 51 acts on a slidably mounted member 52, which is connected to the cylindrical shaped member 35 by screws 53 (see FIG. 3). The screws 53 are screwed into portions 54 of the member 52. The portions 54 have slots therebetween to receive the ears 46 of the sleeve 25.

The amount of movement of the slidably mounted member 52 by the spring 51 is limited by a ring 55, which is carried in a housing 56 for the spring 51 and the slidably mounted member 52. The housing 56 is threaded to the spindle 11 for rotation therewith.

When the draw bar 24 is moved to the right by the spring 51, the balls 21 are wedged within the sleeve 23. This is because the cage 22 is moved to the right with the draw bar 24 so that the balls 21 are cammed by the radial surface 22' of the extension 19 and retained between the reduced area of the sleeve 23 and the radial surface 22' of the extension 19 as shown in FIG. 1A.

Considering the operation of the present invention when employed with an automatic tool changing mechanism and a numerical control apparatus with the tool adapter 17 disposed within the spindle 11 as shown in FIG. 1A, the numerical control apparatus would initially cause fluid to be supplied to the chamber 36 to move the piston 34 to the left. This would move the draw bar 24 to the left to break the tight fit between the tool adapter 17 and the spindle 11. This is accomplished through the plug 26 initially engaging the extension 19 of the tool adapter 17 and then the resiliently biased plunger 27 moving the tool adapter 17 an additional distance after the tight fit between the tool adapter 17 and the spindle 11 has been broken by movement of the piston 34 due to the fluid supplied to the chamber 36 through the passage 38.

The numerical control apparatus would then position the transfer arm of the tool changing mechanism in the groove 33 of the tool adapter 17 so that it would grasp the tool adapter 17. After this motion has been completed, the numerical control apparatus would allow fluid to be supplied to the chamber 41 to move the piston 40 to the right. This causes the sleeve 23 to move to the right until the balls 21 enter the enlarged area 32 of the sleeve 23.

Then, the numerical control apparatus would cause the tool transfer mechanism to remove the tool adapter 17 from the spindle 11. The elements of the mechanism of the present invention would remain in this position because of the positions of the pistons 34 and 40 until another of the tool adapters 17 is disposed within the recess 15 in the spindle 11.

After another of the tool adapters 17 is disposed within the spindle 11, the numerical control apparatus would cause fluid to be supplied to the chamber 41 through the passage 43 and removed from the chamber 41 through the passage 42 to move the piston 40 to the left. This would move the sleeve 23 to the left to urge the balls 21 into disposition within the groove 20 of the extension 19 of the tool adapter 17. However, there would still be a slight clearance between the sleeve 23 and the balls 21 at this time. Of course, the tool adapter 17 would now be retained within the spindle 11. As a result, the numerical control apparatus would cause the tool changing mechanism to remove its tool transfer arm.

After the tool transfer arm has been removed from the tool adapter 17, the numerical control apparatus would cause the supply of fluid to the chamber 36 through the passage 39 and the removal of fluid to the chamber 36 through the passage 38 to move the piston 34 to the right. When this occurs, the spring 51 would urge the draw bar 24 to the right to move the balls 21 along the radial surface 22' of the extension 19 until the balls 21 are wedged between the sleeve 23 and the radial surface 22' of the extension 19.

While the foregoing operation has been described in conjunction with a numerical control apparatus, it should be understood that such is not mandatory for operation of utilization of the present invention. Thus, the supply of fluid to each of the chambers 36 and 41 could be controlled by manual valves or by solenoid valves, for example.

While the present invention has shown the tool 18 as being a milling cutter, it should be understood that various other types of tools may be readily utilized. For example, a boring bar, a reamer, a drill, or a tap could be employed with the present invention.

While the present invention has shown the tool adapter 17 and the spindle 11 having cooperating tapered surfaces, it should be understood that such is not a requisite for the present invention. Thus, the present invention may be utilized with other types of cooperating surfaces between the spindle and the tool adapter.

While the present invention has been shown as being employed with a spindle that is only rotatable within the housing, it should be understood that the present invention could be employed with a spindle, which is movable relative to its housing in addition to being rotatable.

An advantage of this invention is that it eliminates the possibility of the tool adapter sticking within the spindle. Another advantage of this invention is that it insures that the tool adapter does not fall out of the spindle after the tight connection between the spindle and the tool adapter is broken. A further advantage of this invention is that a self-centering tool adapter may be employed with an automatic tool changing mechanism without any danger of the tool being damaged by falling out of the spindle during transfer operations.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

What I claim is:

1. In a machine tool having a spindle, a tool adapter for supporting a tool, the spindle and the tool adapter having cooperating surfaces to form a tight fit therebetween and to support the tool adapter within the spindle, and means to retain the tool adapter in the spindle, the improvement comprising:
   first means movable to break the connection between the cooperating surfaces of the tool adapter and the spindle while the retaining means remains effective;
   and second means, separate from said first means, movable to render the retaining means ineffective only after said first means has broken the connection between the tool adapter and the spindle and said first means has ceased to move, said second means being stationary during movement of said first means and vice versa.

2. The improvement according to claim 1 in which said first means and said second means are movable in opposite directions.

3. The improvement according to claim 2 in which said first means moves in the direction in which the tool adapter is moved.

4. The improvement according to claim 1 in which:
   said first means includes:
      a movable piston;
      and means responsive to movement of said movable piston and acting on the tool adapter to break the connection between the cooperating surfaces of the tool adapter and the spindle;
   and said second means includes:
      a movable piston movable in directions parallel to the axis of the spindle;
      and means responsive to movement of said movable piston of said second means to render said retaining means ineffective, said movable piston of said second means remaining in the position to which it moved to render said retaining means ineffective until another tool adapter is disposed in the spindle.

5. The improvement according to claim 4 in which said movable piston of said first means is movable in the opposite direction to said movable piston of said second means, said movable piston of said first means being stationary when said movable piston of said second means moves and vice versa.

6. The improvement according to claim 5 in which said movable piston of said first means moves in the same direction as the tool adapter is moved to remove the tool adapter from the spindle.

7. The improvement according to claim 4 in which said first means includes means movable in the opposite direction to that in which said movable piston of said first means moves when the tool adapter is removed from the spindle, said movable means causing movement of said responsive means of said first means to clamp the tool adapter in the spindle when the tool adapter is disposed within the spindle.

8. The improvement according to claim 7 in which said movable means of said first means is not effective until after said movable piston of said second means renders said retaining means effective.

9. The improvement according to claim 1 in which the cooperating surfaces are tapered.

10. The improvement according to claim 1 in which:
   the retaining means includes:
      means engaging the tool adapter;
      and means cooperating with said engaging means to retain said engaging means in a position to retain the tool adapter in the spindle;
   means to hold said cooperating means of the retaining means stationary during breaking of the connection of the tool adapter and the spindle by said first means;
   and said second means includes means to move said cooperating means of the retaining means relative to said engaging means of the retaining means to render the retaining means ineffective.

UNITED STATES PATENT OFFICE
CERTIFICATE OF CORRECTION

Patent No. 3,583,280                    Dated     June 8, 1971

Inventor(s)    Charles E. Hart

It is certified that error appears in the above-identified patent and that said Letters Patent are hereby corrected as shown below:

Column 1, line 5, "cool" should read -- tool --; line 7, before "for" insert a comma; line 16, "with" should read -- within --; line 19, "self-centered" should read -- self centered --; line 41, after "adapter" insert -- within the spindle to prevent the tool adapter --. Column 2, line 19, "antifriction" should read -- anti-friction --; line 62, "percent" should read -- inches --. Column 3, line 19, after "lant" insert -- passage 31 allows a coolant --; line 31, "pushed" should read -- pushes --; line 38, "cylindrical-shaped" should read -- cylindrical shaped --. Column 4, line 11, "cylindrical-shaped" should read -- cylindrical shaped --. Column 5, line 13, "to" should read -- from --.

Signed and sealed this 7th day of March 1972.

(SEAL)
Attest:

EDWARD M. FLETCHER, JR.                        ROBERT GOTTSCHALK
Attesting Officer                              Commissioner of Patents